Patented Mar. 16, 1943

2,313,739

UNITED STATES PATENT OFFICE 2,313,739

NAPHTHALENIC COMPOUND

Edward A. Doisy, Webster Groves, Sidney A. Thayer, Kirkwood, Stephen B. Binkley, Richmond Heights, and Ralph W. McKee, St. Louis, Mo., and Donald W. MacCorquodale, Highland Park, Ill., assignors to President and Board of Trustees of St. Louis University, St. Louis, Mo.

No Drawing. Application February 23, 1940, Serial No. 320,426

9 Claims. (Cl. 167—81)

The invention relates to new antihemorrhagic products derived from naphthalene and to methods for obtaining the same. It relates more particularly to therapeutic products comprising certain amino-substituted naphthalenes.

An object of the present invention is to provide a new class of antihemorrhagic products which can be administered either in oil solution or in aqueous solution. Another object of the invention is to supply preparations which are stable and can be provided in various forms, solid or liquid, for administration, either orally or by injection.

We have found that the above mentioned and other desirable objects of the invention are attained by making use of 1-amino-4-hydroxy naphthalenes and their salts having an alkyl substituent at the number 2 position of the naphthalene nucleus.

The new antihemorrhagic products of the invention are made by utilizing compounds of the following general formula,

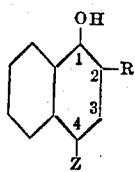

where Z is a member of the group amino (—$NH_2$) and water solubilizing ammonium type salt groups derived therefrom, and R is an alkyl radical, saturated or unsaturated.

The following examples illustrate the invention.

EXAMPLE 1.—*2-ethyl-4-amino-1-naphthol and its salts*

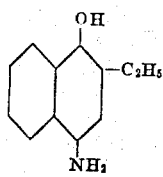

2-ethyl-4-amino-1-naphthol 15.5 grams of 2-acetyl-α-naphthol dissolved in 100 cc. of glacial acetic acid is refluxed for 26 hours with 60 grams of amalgamated zinc. Two or three cc. of concentrated hydrochloric acid are added from time to time, 30 cc. in all being added. The supernatant liquid is decanted from the zinc and diluted with four volumes of water. The product is extracted with ether, the ether extract washed with water and evaporated to dryness. The oily residue is distilled at 3 mm. pressure and the fractions boiling up to 130° C. are cooled. When the distillate is taken up in and crystallized from petroleum ether, about 8½ grams of crystalline 2-ethyl-α-naphthol melting at 66° C. is obtained.

A mixture of 9.66 grams of sulfanilic acid dihydrate, 2.44 grams of anhydrous sodium carbonate and 46 cc. of water is heated and stirred until all the sulfanilic acid dissolves. The solution is then cooled in an ice bath to 15° C. and a solution of 3.40 grams of sodium nitrate in 9.2 cc. of water is added. The resulting solution is poured at once onto a mixture of 9.75 cc. of concentrated hydrochloric acid and 55 grams of ice. The product thus obtained contains diazotized sulfanilic acid and is allowed to stand in an ice bath for 15 to 20 minutes.

8.1 grams of 2-ethyl-α-naphthol are dissolved in a warm solution of 10.1 grams of sodium hydroxide in 46 cc. of water and the solution is cooled by adding 37 grams of ice. The above described suspension of diazotized sulfanilic acid is added to the solution of 2-ethyl-α-naphthol and the mixture stirred well and allowed to stand for one hour.

At the end of the hour the dark red solution is heated to about 50° C. and approximately one gram of sodium hydrosulfite ($Na_2S_2O_4$) is added cautiously, after which 7 grams of the hydrosulfite are added all at once. The mixture is heated to 70° C. and cooled quickly with stirring, filtered, and washed with 100 cc. of 1% sodium hydrosulfite solution. The crude amine left on the filter is taken up without delay in a solution of 0.2 gram of stannous chloride in 5.8 cc. of concentrated hydrochloric acid and 73.6 cc. of water at 30°. The dissolved amine is heated to boiling, filtered, 9.2 cc. of concentrated hydrochloric acid added, the mixture again heated to boiling and a second 9.2 cc. portion of acid added. The mixture is cooled to 0° C. and filtered, giving around 10 grams of hydrochloride of 2-ethyl-4-amino-1-naphthol.

The 2-ethyl-4-amino-1-naphthol free base can be obtained by neutralizing the hydrochloride, for example, using sodium carbonate solution, and filtering off the insoluble free base and drying it out of contact with air and sunlight.

The free base of this example is conveniently administered as an antihemorrhagic agent for oral administration by dissolving it in vegetable oil solution such as olive oil, peanut oil or cocoanut oil. The hydrochloride is water-soluble and can be administered by injection as well as orally.

The hydrochloride can be made from the free base by reacting the latter with the necessary amount of hydrochloric acid. Other acids, such as sulfuric or phosphoric, or like mineral acid, and also carboxylic acids, such as lactic acid, oxalic acid, tartaric acid, citric acid, acetic acid, etc., can be used instead of hydrochloric acid to produce the corresponding salts of 2-ethyl-4-amino-1-naphthol. The salts can be administered in solid form or in solution form, as desired, and are generally applicable as antihemorrhagic agents.

EXAMPLE 2.—*2-propyl-4-amino-1-naphthol and its salts*

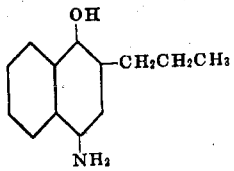

2-propyl-4-amino-1-naphthol
(i. e., 1-amino-3-n-propyl-4-hydroxy-naphthalene)

In this example, 2-propyl-1-naphthol is coupled with diazotized sulfanilic acid and the coupled product reduced at the diazo group to give an amino-naphthol derivative.

In order to prepare the diazotized sulfanilic acid, 80 grams of sulfanilic acid dihydrate are dissolved by heating with 22 grams of sodium carbonate and 380 cc. of water. The solution is cooled to 15° C. and 60 grams of sodium nitrite in 100 cc. of water added. The mixed solution is then poured into 85 cc. of concentrated hydrochloric acid and 500 grams of ice and allowed to stand for about 15 minutes to give a suspension of diazonium salt.

70 grams of 2-propyl-1-naphthol, prepared as described by Stoughton, J. Amer. Chem. Soc., vol. 57:202 (1935), are dissolved in a warm solution of 90 grams of sodium hydroxide in 500 cc. of water, the mixture cooled to 25° C. and 300 grams of ice added. The suspension of diazonium salt is then added with stirring to the cooled solution of 2-propyl-1-naphthol and the mixture allowed to stand for 1 hour at room temperature. A suspension of the dark red azo compound is obtained and is reduced by warming the mixture to 45° C. and carefully adding 170 grams of sodium hydrosulfite ($Na_2S_2O_4$). After all the hydrosulfide is added, the solution is heated to 70° C., cooled quickly, and filtered rapidly. The product on the filter is washed at once with 200 cc. of concentrated hydrochloric acid and 5 liters of water containing 1.6 grams of stannous chloride ($SnCl_2$). The hot solution is filtered and 1 liter of concentrated hydrochloric acid added, whereupon the white crystalline hydrochloride of 2-propyl-4-amino-1-naphthol separates out. After cooling, the crystalline product is separated by filtration and recrystallized by dissolving in 2.5 liters of water and then adding 400 cc. of concentrated hydrochloric acid. The hydrochloride melts at 265–266° C. with decomposition.

The 2-propyl-4-amino-1-naphthol free base is obtained as described above under Example 1 for preparation of the free base of 2-ethyl-4-amino-1-naphthol. The free base of this example can also be reacted with various mineral acids and carboxylic acids to obtain salts. Many of these salts are water-soluble and permit the 2-propyl-4-amino-1-naphthol to be utilized in aqueous solution for its antihemorrhagic properties.

EXAMPLE 3.—*2-allyl-4-amino-1-naphthol and its salts*

Diazotized sulfanilic acid is first prepared for coupling with 2-allyl-1-naphthol.

A mixture of 21.4 grams (0.102 mol.) of sulfanilic acid dihydrate, 5.4 grams (0.051 mol.) of anhydrous sodium carbonate and 102 cc. of water is heated and stirred until the sulfanilic acid dissolves, whereupon the solution is cooled to about 15° C. The cold solution of 7.58 grams (0.110 mol.) of sodium nitrite in 20 cc. of water is added and the resulting solution poured promptly into a mixture of 21.7 cc. of concentrated hydrochloric acid and 125 grams of ice. When this mixture is stirred, the diazotized sulfanilic acid separates. It is allowed to stand in the ice bath for 25 minutes.

18.8 grams (0.102 mol.) of 2-allyl-1-naphthol are dissolved in a warm solution obtained by dissolving 22.5 grams (0.563 mol.) of sodium hydroxide in 123 cc. of water. The solution is cooled to 25°, 82 grams of crushed ice introduced and the suspension of diazotized sulfanilic acid added. The resulting deep red solution is allowed to stand for 1 hour without external cooling.

The deep red solution is heated to 50° C. and 47 grams (about 0.22 mol.) of sodium hydrosulfite added in one portion. The mixture is shaken and heated to 70°. The orange-brown product is cooled in an ice bath and then filtered and washed with 300 cc. of 1% sodium hydrosulfite solution and then transferred without delay to a solution of 1 gram of stannous chloride in 52 cc. of concentrated hydrochloric acid and 650 cc. of water. Upon heating and stirring, the amine dissolves. The hot solution is then filtered and the filtrate treated with 82 cc. of concentrated HCl. The solution is gently boiled for 5 or 10 minutes, another 82 cc. portion of acid added and the resulting suspension cooled to 5° C. The suspension is filtered to separate a pale pinkish-tan compound which, upon heating, darkens and then decomposes at 239–241° C. By redissolving the pinkish-tan product, treating the solution with decolorizing charcoal, filtering it from the charcoal and recrystallizing, snow white needles of pure 2-allyl-4-amino-1-naphthol hydrochoride are obtained which also decompose at 239–24° C. with previous darkening. The hydrochloride of this example can be neutralized, for example with sodium carbonate solution, to precipitate out the 2-allyl-4-amino-1-naphthol free base. The free base can be prepared for use as an antihemorrhagic agent in solid form, with or without admixture of other solid ingredients, or by dissolving it in a suitable oil for oral administration. Hypodermic solutions can also be prepared and the salts can be made in the same way as described under Examples 1 and 2 above by treating the free base with the necessary quantities of mineral acid or carboxylic acid.

The free base compounds of the above examples can be prepared in the form of their solutions in vegetable oils, such as olive, peanut or cocoanut oils, for oral administration and are useful in such form as antihemorrhagic agents. The hydrochlorides of the amine free base compounds and other ammonium-type salts have the advantage that they are water-soluble and can be administered orally or by injection to decrease blood coagulation time in patients deficient in antihemorrhagic vitamins.

Various mineral acids and carboxylic acids, such as sulfuric, phosphoric, lactic, oxalic, tartaric, malic, citric, etc., can be combined with the free base compounds to obtain water-soluble salts other than those described in the examples.

The invention is not limited to the use of those particular alkyl substituted compounds disclosed in the examples, since other 2-alkyl-substituted-4-amino-1-naphthol compounds and various salts of the same can, in a manner similar to that given in the examples, be readily obtained and used for their antihemorrhagic properties. For example, 2-methyl-4-amino-1-naphthol, 2-isopropenyl-4-amino-1-naphthol, 2-cyclhexyl-4-amino-1-naphthol and the like can be utilized.

It is to be understood that the compounds of the general formula,

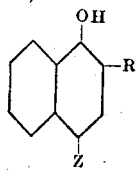

where Z is an amino or corresponding ammonium-type salt group and R is alkyl, can be utilized in accordance with the invention by preparing alkaline solutions of the same, since the compounds have a phenolic hydroxyl group capable of forming a water-soluble alkali metal or similar phenolate-type of compound in alkaline solutions. The invention therefore includes use of the phenolates of the compounds with the general formula given above.

The preferred salt compounds of the invention are the salts of the amino naphthols which are soluble to an appreciable extent in water and aqueous solutions. In general, the more water-soluble salts are the mineral acid salts and salts of lower carboxylic acids and lower hydroxy carboxylic acids. In many instances, the lower alkyl substituted amino naphthols of the invention are more accessible and economical to use than the higher alkyl compounds. Furthermore, some of the lower alkyl members have outstanding antihemorrhagic activity.

What we claim as our invention is:

1. A preparation useful for its antihemorrhagic properties comprising as an essential ingredient a solution of a 2-(lower alkyl)-4-amino-1-naphthol.

2. A preparation useful for its antihemorrhagic properties comprising as an essential ingredient an aqueous solution of a mineral acid salt of 2-(lower alkyl)-4-amino-1-naphthol.

3. A preparation useful for its antihemorrhagic properties comprising as an essential ingredient an oil solution of a 2-(lower alkyl)-4-amino-1-naphthol.

4. A preparation useful for its antihemorrhagic properties comprising as an essential ingredient a mineral acid salt of a 2-(lower alkyl)-4-amino-1-naphthol.

5. A preparation useful for its antihemorrhagic properties comprising as an essential ingredient a water-soluble mineral acid salt of a 2-(lower alkyl)-4-amino-1-naphthol.

6. A preparation useful for its antihemorrhagic properties comprising as an essential ingredient a compound of the class consisting of a 2-(lower alkyl)-4-amino-1-naphthol and its ammonium-type acid addition salts.

7. A preparation useful for its antihemorrhagic properties comprising as an essential ingredient an aqueous solution of a water-soluble ammonium-type acid addition salt of a 2-(lower alkyl)-4-amino-1-naphthol.

8. A preparation useful for its antihemorrhagic properties comprising as an essential ingredient an ammonium-type acid addition salt of 2-allyl-4-amino-1-naphthol.

9. An antihemorrhagic composition comprising the hydrochloride of 2-allyl-4-amino-1-naphthol.

EDWARD A. DOISY.
SIDNEY A. THAYER.
STEPHEN B. BINKLEY.
RALPH W. McKEE.
DONALD W. MacCORQUODALE.